United States Patent Office 2,987,830
Patented June 13, 1961

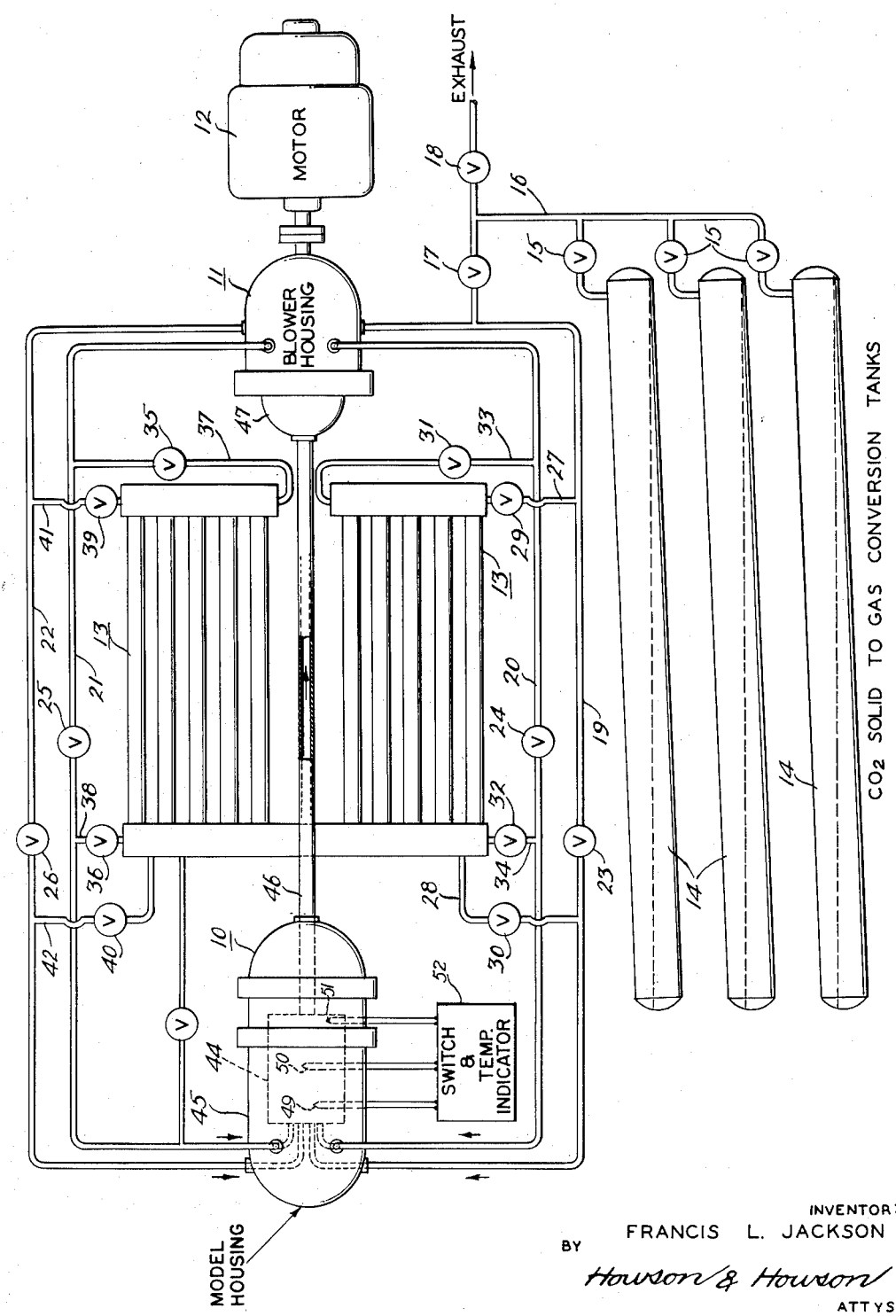

2,987,830
METHOD OF SIMULATING COOLANT FLOW IN A MODEL OF A REACTOR
Francis L. Jackson, Media, Pa., assignor to The Franklin Institute, Philadelphia, Pa., a corporation of Pennsylvania
Filed June 16, 1958, Ser. No. 742,328
12 Claims. (Cl. 35—13)

This invention relates to a method of simulating closely the flow patterns in the liquid coolant of a prototype reactor in a scale model thereof, with a moderate expenditure of pumping power. This invention also relates to the reactor model through which the coolant-simulating gas is circulated, as part of a closed loop system also including a pressurized blower by means of which this circulation is accomplished.

In designing nuclear reactors it is common practice first to build scale models which can be constructed and tested at reasonable cost and modified in accordance with the information acquired from the model testing until the desired conditions are obtained whereupon the full scale prototype may be built. One of the vital elements in a nuclear reactor is the coolant circuit, whereby the heat generated in the core is removed for use in generating power, or other useful purposes. Relatively high power is required to maintain adequate flow of coolant through a properly designed core. Appropriate flow rates through the different regions and passes of a core must be maintained for good thermal performance and to avoid heat damage to the core structure. Another consideration is the mixing of coolant coming from various branches of the coolant circuit into the core, particularly during an accident to a branch circuit. Models of reactors which have been built heretofore in order to test pressure drops, flow distribution, and mixing in the coolant passages have attempted to include a flow system which would as closely possible simulate the actual conditions which exist in the full-scale prototype reactor. In practice, however, this has proved to be difficult, and the combinations of fluids and velocities employed have not reproduced the flow patterns which would occur in a full-size reactor with satisfactory precision.

Here "flow pattern" denotes the space values of the fluid velocity (both direction and magnitude) and their time variations. That is, to reproduce the flow pattern of the prototype in a model, the ratios of random radial and tangential velocity components to the axial component of velocity would be the same in corresponding regions of the flow passages, the formation of vortices would be duplicated not only in proportion to the size scale of the model but in the timing and amplitude of their buildups and decay, and the space distributions and time variations of mass rate of flow over each cross-section of each passage would be substantially the same.

One of the conditions, which must be satisfied in connection with the fluid used to simulate the coolant in the scale model in order for it to satisfy the foregoing flow patterns of the full size reactor is the matching of the Reynolds numbers of the reactor and the model. For reliable information to be obtained from the model, its Reynolds number must be essentially the same as that of the reactor. Reynolds number is defined in fluid mechanics as the ratio of the product of a characteristic linear dimension of the flow passage by the velocity of the fluid, to the kinematic viscosity of the fluid. Even though it is known that ideally the model and the prototype Reynolds number should be equal, this has not heretofore been found possible using a reasonable amount of power to circulate the fluid in the model. In many cases the Reynolds number in models has been on the order of one percent of the Reynolds number in the full scale reactor. The applicant, however, has discovered that certain gases under high pressure are susceptible of very close simulation in a model of the Reynolds number achieved in an actual reactor, yet with a modest power input to a relatively compact blower furnishing the required flow velocity.

Heretofore, reactor models have been constructed in which water or other liquids have been employed. Wherever liquids have been employed it has required a huge amount of power to obtain even poor simulation of the flow pattern of coolant in actual reactors.

Other models have involved the use of air as coolant, the air being blown through the model and allowed to escape. This method not only fails to simulate the flow pattern, but also introduces errors caused by the expansion of the air in its transit of the model.

In practice, coolant-circulating systems of these types have rarely achieved a Reynolds number which bears a ratio relationship of greater than $\frac{1}{100}$ to Reynolds numbers experienced in actual reactors.

In accordance with the method of the present invention, a gas having a low viscosity and relatively high density is passed through the reactor model at high pressure sufficient to increase its density and thus decrease its kinematic viscosity. Any gas which has a low kinematic viscosity, that is, a low absolute viscosity relative to its density at convenient temperature and pressure ranges may be employed. It should be capable of being compressed to high density in the range of temperature at and above room temperature. Most satisfactory of such gases is carbon dioxide which provides a low absolute viscosity relative to its density. Other gases having these properties to a lesser degree may also be used in accordance with the present invention with relatively less satisfactory results. For example, some of the coolants tradenamed "Freon" have excellent qualities for the purpose, but none provide the favorable ratio provided by carbon dioxide in addition to low cost and well-established, quantitative, thermodynamic properties. "Freon" is a trade name applied to a group of fluorochloromethanes and fluorochloroethanes possessing thermal and chemical properties making them very desirable for use as refrigerants. In particular they are materials having high density and relatively low viscosity at the temperatures of use. Particularly suitable for use in the system of the present invention, by way of example, are Freon 12, dichlorodifluoromethane $CCl_2F_2$; Freon 13, monochlorotrifluoromethane $CClF_3$, and Freon 22, monochlorodifluoromethane $CHClF_2$.

The advantage of the gases under pressure such as carbon dioxide in its gaseous phase is that the kinematic viscosity is not nearly so great as that of water and other liquid coolants, so that the amount of power required to circulate it, even under conditions of high compression, is relatively small. A further advantage is the ease with which it is held at desired temperature during a model test run.

In addition to the method of the present invention, a preferred system employing that method has been devised. This system consists of a closed pressurized flow system in connection with the model of a reactor in which a gas of low viscosity and relatively high density is employed to simulate coolant flow maldistribution, mixing and pressure drop. This system may, and preferably does, include blower means for creating the flow under pressure and heat exchangers for controlling the temperature of the gas. If carbon dioxide is used to simulate the coolant, a carbon dioxide supply may also be included.

For a better understanding of the present invention, reference is made to the following drawing in which details of a typical model test of the coolant flow through a reactor are illustrated:

FIG. 1 illustrates schematically the flow loop furnishing the simulated coolant flow through a typical model in accordance with the present invention.

Referring to FIG. 1, there is shown schematically a system which includes a model 10 of a nuclear reactor built insofar as possible exactly to scale to the full sized reactor which it is intended to simulate. This model is provided with internal coolant passages which are connected with a closed pressurized system for recirculating gas, such as carbon dioxide. Recirculation is accomplished by means of a blower 11 driven by a motor 12. A bank of heat exchangers 13 is provided to remove frictional heat and allow operation of each branch of the circuit at a particular controlled temperature for the purpose of studying mixing of flows with the reactor model.

In actual reactors, instead of a gaseous recirculating system there is often a pressurized water system, or other liquid having a relatively high heat storage capacity. In the prior art of reactor modelling, flowing water has been used as a fluid in the reduced-scale model. However, this requires still higher flow velocities and, consequently, high power input for pumping the circulating fluid in order to obtain useful simulation of Reynolds number. While reasonably satisfactory simulation has been obtained for the models of the preliminary test reactors such as those featured at the inception of the nuclear power program in the United States, the pumping requirements for water loops for models of large power reactors became unreasonably large. For relief from the severe pumping requirements of water, many experimenters have used low-pressure air in the endeavor to simulate the flow phenomena of liquid coolants. Such a coolant provides a Reynolds number which has a ratio of .01 or .02 to the Reynolds number of the actual coolant used in the full-size reactor. The use of low-pressure air also allows compressibility effects to introduce significant errors when full flow resistance of fuel elements is simulated. Even large power inputs to blowers do not significantly increase the Reynolds number in such systems. By using the closed, pressurized system of the present invention, density variations are reduced and higher Reynolds number can be obtained for a given blower capacity because of a decrease in kinematic viscosity of gases with increased pressure.

In accordance with the specific embodiment employing carbon dioxide, the carbon dioxide is stored as a solid in tanks 14 which are connected by suitable valves 15 to a supply line 16. The supply line is connected to the system itself through a valve 17 or to an exhaust through a valve 18. Within the system the carbon dioxide follows established circulation paths along tubing conduits of a dimension in accordance with the scale employed in the model and geometry in accordance with the actual physical arrangement of the reactor simulated. The gas under pressure from the blower will pass directly to the model through any of the lines 19, 20, 21 and 22, if valves 23, 24, 25 and 26, respectively, are open. If valve 23 is closed, flow will proceed, instead, through lines 27 and 28 by way of the elements of heat exchanger 13 if valves 29 and 30 are both open. Similar paths are available by way of the heat exchanger when valves 24, 25 or 26 are closed if valves 31 and 32 in lines 33 and 34, if valves 35 and 36 in lines 37 and 38, or if valves 39 and 40 in lines 41 and 42 be open. With partly opened valves, various fractions of flow can bypass the cooler concerned. The heat exchanger may be of any of a variety of well-known types. For example, it may be composed of tubular members through which the gaseous fluid passes concentrically within larger tubing through which cooling water is passed.

Lines 19, 20, 21 and 22 enter different points in the reactor model housing through gas-tight connections and are circulated through the core 44 of the model. The core is so arranged within the housing vessel 45, which provides a strong gas tight casing, that the gasses tend to flow through rather than around it and so that the complex flow which takes place in the actual reactor is satisfactorily simulated. Thereafter, the gas flows out duct 46 which is sealed gas tight to the housing like all other joints in the system. Gases return thence to the blower housing 47, which may simply be a shell with a blower fan located therein with suitable baffling so that flow passes almost entirely through the blower whereby circulation remains constant.

Temperature at selected locations within the core 44 of the model reactor can be determined by means of the thermocouples 49, 50 and 51 placed at these locations and preferably switchably connected to suitable amplifier and meter means 52 which may be calibrated directly in terms of temperature, if desired.

In one embodiment of the present invention the carbon dioxide was employed at 1200 pounds per square inch pressure in order to secure a Reynolds number corresponding to that experienced in an actual reactor which the model was intended to simulate.

In addition to simulating in a model the actual flow which occurs in a reactor, the present invention enables various important studies of reactor coolant flow phenomena, which could be made heretofore, to be performed.

One such study involves variation of the Reynolds number by variation of the pressure of the coolant gas in the closed system. This test has enabled verification of the belief that a ratio of 1:1 in reactor: model Reynolds numbers makes for closest simulation in the model of the cooling effect to be expected in the reactor. It has also provided a valuable research tool whereby the effect of variation of the Reynolds number in the model, and hence in the reactor, may be studied and valuable information, such as information about safe operational limits of coolant conditions in a reactor, may be determined.

Similarly the mixing of fluid from different model inlets may be studied as well as the effect of variation in the rate of flow at the various inlets may be studied using the system of the present invention which employs flow control and diverting means in the flow paths to vary the amount of flow and/or the temperature of the coolant in a particular flow line. For example, by adjustment of appropriate valves, equal volumetric flows can be obtained in all loops, with all loops at the same temperature except one which by-passes its heat-exchanger and operates at a higher temperature by virtue of the friction losses in the circuit. When a steady-state condition has been attained, by measuring the distribution of temperature at the cross-section of the flow path in question, it is possible to calculate by the laws of thermodynamics what fraction of the flow passing each thermometry probe originated from the hotter loop. Discussion of the many possible combination of valve combinations has not been considered as it may be visualized or experimented with by one skilled in the art.

In passing it will be observed that, in addition to the advantages already recited, the use of pressurized gas has the advantages over liquids of permitting the use of small diameter tubing in manometer leads and eliminating any need to deaerate the system. The use of small tubing has advantages in models, particularly in connections to manometers through regions where space is at a premium. The avoidance of the need of deaerating the system avoids a painfully tedious procedure.

It will be appreciated by those skilled in the art that invention is not limited to the form shown in the drawings. It will be clear that the number of flow lines or circuits and their inlet positions at the reactor model housing may be infinitely varied. The type flow system and the components therein may also be varied using the many other combinations which would occur to one skilled in the art.

I claim:
1. The method of testing the effect of variation in Reynolds number upon a reactor comprising in a scale model of a reactor passing a gas having low viscosity, high pressure relative to the atmosphere, and relatively high density through a closed system including the flow system of the model and varying the pressure upon the gas in order to vary its density and thus inversely affect its kinematic viscosity so that its Reynolds number varies within a wide range of limits.

2. A system for simulating flow conditions including Reynolds number simulation in a reactor comprising a reactor model having flow passages similar to those of the reactor simulated, a fluid motion imparting means, a closed loop flow system including the reactor model and the fluid motion producing means, and means for supplying a gaseous coolant to the loop at any desired pressure high relative to atmospheric pressure.

3. The system of claim 2 in which the gas employed is carbon dioxide.

4. The system of claim 2 in which the gas employed is a chlorofluoromethane which includes at least one chlorine substituent and at least two fluorine substituents.

5. The system of claim 2 in which the fluid motion producing means is a blower.

6. The system of claim 5 in which a reserve supply of gaseous material is available for introduction into the closed loop or for storage of gaseous material removed from the loop.

7. The system of claim 2 in which a heat exchanger is provided in the loop.

8. The system of claim 7 in which an alternative flow path for bypassing part or all of the heat exchanger is provided and valve means for adjusting the relative amounts of gaseous material entering and bypassing the heat exchanger.

9. The system of claim 2 in which the loop is provided with parallel branches entering the reactor model, means for regulating the temperature of the gas in the parallel branches as it enters the reactor model, and means for sensing temperature in various locations within the reactor model to determine the degree of mixing of gas streams which has been effected by the shapes of the flow passages in the models upstream from the temperature-sensing location.

10. The method of simulating in a model the flow pattern of the coolant in a structure having a cooling system so that the Reynolds number in the cooling of the model corresponds to that of the coolant in the actual structure being simulated comprising passing a gas having low viscosity, high pressure relative to the atmosphere and relatively high density through a closed system including the flow system of the model and regulating the pressure of the gas in order to regulate its density.

11. The method of claim 10 in which the gas employed is a chlorofluoromethane which includes at least one chlorine substituent and at least two fluorine substituents.

12. The method of claim 10 in which the gas employed is carbon dioxide.

References Cited in the file of this patent
UNITED STATES PATENTS
2,164,000  Keller _____ June 27, 1939

OTHER REFERENCES
BMI-1141, October 19, 1956, 47 pages, pages 1–15, particularly.
"Atomics," June 1955, pages 156–157.
CP–3061, June 23, 1945, declassified December 14, 1955, pages 3, 32–35.

UNITED STATES PATENT OFFICE
CERTIFICATE OF CORRECTION

Patent No. 2,987,830                                    June 13, 1961

Francis L. Jackson

It is hereby certified that error appears in the above numbered patent requiring correction and that the said Letters Patent should read as corrected below.

Column 1, line 38, after "closely" insert -- as --; same column 1, lines 60, 62, 63, 68, 71, and 72, column 2, lines 3, 18 and 19, column 3, lines 24, 34, 35, 40 and 43, column 4, lines 19, 27, 30 and 34, column 5, lines 2 and 3, 9 and 12, and column 6, line 12, for "Reynolds", each occurrence, read -- Reynolds' --; column 4, line 25, after "could" insert -- not --; column 6, line 12, for "cooling" read -- coolant --.

Signed and sealed this 19th day of December 1961.

(SEAL)
Attest:

ERNEST W. SWIDER                                              DAVID L. LADD
Attesting Officer                                                Commissioner of Patents